US011300808B2

(12) United States Patent
Yang et al.

(10) Patent No.: US 11,300,808 B2
(45) Date of Patent: Apr. 12, 2022

(54) STEREOSCOPIC IMAGE DISPLAY APPARATUS

(71) Applicant: Lixel Inc., Taipei (TW)

(72) Inventors: Chun-Hsiang Yang, Hsinchu (TW);
Yi-Pai Huang, Hsinchu (TW);
Chih-Hung Ting, New Taipei (TW);
Kai-Chieh Chang, Kaohsiung (TW);
Jui-Yi Wu, Miaoli County (TW);
Kuan-Yu Chen, Taichung (TW)

(73) Assignee: Lixel Inc., Taipei (TW)

( * ) Notice: Subject to any disclaimer, the term of this patent is extended or adjusted under 35 U.S.C. 154(b) by 0 days.

(21) Appl. No.: 17/012,027

(22) Filed: Sep. 3, 2020

(65) Prior Publication Data

US 2022/0066234 A1    Mar. 3, 2022

(51) Int. Cl.
*G02F 1/1335* (2006.01)
*G02B 30/33* (2020.01)
*F21V 8/00* (2006.01)
*G02F 1/13357* (2006.01)

(52) U.S. Cl.
CPC ........... *G02B 30/33* (2020.01); *G02B 6/0068* (2013.01); *G02F 1/133514* (2013.01); *G02F 1/133603* (2013.01); *G02F 1/133621* (2013.01)

(58) Field of Classification Search
CPC ................................................ G02F 1/133514
See application file for complete search history.

(56) References Cited

U.S. PATENT DOCUMENTS

| 11,150,512 | B2* | 10/2021 | Tsai | G02F 1/133605 |
| 2015/0364068 | A1* | 12/2015 | Yao | G02F 1/133514 345/690 |
| 2016/0255337 | A1* | 9/2016 | Chen | G02B 30/33 348/59 |
| 2019/0258063 | A1* | 8/2019 | Hudman | G02B 27/0172 |
| 2020/0251061 | A1* | 8/2020 | Nishiguchi | G09G 3/3208 |

FOREIGN PATENT DOCUMENTS

| CN | 202171689 U | 3/2012 |
| CN | 103197426 B | 2/2015 |
| CN | 103209333 B | 8/2016 |
| TW | M315837 U | 7/2007 |
| TW | I614533 B | 2/2018 |
| WO | WO2015095737 A2 | 6/2015 |

* cited by examiner

*Primary Examiner* — Edmond C Lau
(74) *Attorney, Agent, or Firm* — Li & Cai Intellectual Property Office

(57) ABSTRACT

A stereoscopic image display apparatus includes a display module, a backlight module, and an image algorithm. The display module includes a display surface. The display module is configured to turn on a plurality of pixels that are required to be used and turn off a plurality of pixels that are not required to be used. The backlight module is disposed at one side of the display module away from the display surface. The backlight module includes a plurality of light sources. A plurality of un-reconstructed images displayed by the display surface are configured to be reassembled into a plurality of integrated images to form a plurality of stereoscopic images through the light sources and the pixels that are required to be used.

9 Claims, 7 Drawing Sheets

STEREOSCOPIC IMAGE DISPLAY APPARATUS

FIELD OF THE DISCLOSURE

The present disclosure relates to a stereoscopic image display apparatus, and more particularly to a stereoscopic image display apparatus that does not require any lens array component to be disposed thereon.

BACKGROUND OF THE DISCLOSURE

Generally, a conventional stereoscopic image display apparatus mainly employs the binocular vision fusion imaging technology. Regarding these kinds of image display apparatuses, users are required to view a stereoscopic image from a frontal viewing angle, and an image depth cannot be too far away from a display surface of the display apparatuses. When the stereoscopic image display apparatuses are used in certain situations, such as aviation terrain models, building models, and 3D medical training devices, the stereoscopic image display apparatuses are generally placed horizontally. In these situations, viewers naturally view the image from an oblique angle, rather than from the frontal viewing angle when viewing the conventional stereoscopic image display apparatus, thus causing inconvenience to the viewers. Moreover, the conventional stereoscopic image display apparatus provides users with visual stimuli in only one direction, i.e., with the image projected outward or sunken inward. Therefore, the conventional stereoscopic image display apparatus cannot provide a vivid sensation as if the image is escaping from the confines of a plane of the display surface and floating in mid-air.

The Taiwan Patent Publication No. 1614533 discloses a stereoscopic image display apparatus including a flat panel display, a lens array layer, and a microstructure layer. The flat panel display has a display surface. The lens array layer is disposed on the display surface of the flat panel display. The lens array layer includes a base portion, and a plurality of lenses with light focusing function. The lens array layer is configured to make adjustments to a light field. The microstructure layer is disposed on the lens array layer, and the microstructure layer includes a base material and a plurality of microstructures. The microstructure layer is configured to modulate a direction of light emitted from the flat panel display. Accordingly, the stereoscopic image display apparatus is capable of displaying a stereoscopic image floating in mid-air and enabling a user to view the stereoscopic image from an oblique viewing angle. However, the conventional stereoscopic image display apparatus needs to be provided with a lens array component, so that the manufacture cost of the device cannot be reduced. In addition, the lens array component may have problems such as aberration, resulting in degradation of image quality and limitations in the manufacture of the device. Further, since it is difficult for the lens array component to be made into a large piece, the lens array component is not suitable for large size applications, and an integrated image from the lens array component may include a wrong image in other orders when viewed at a large viewing angle, and it is hard for the image quality to be improved.

SUMMARY OF THE DISCLOSURE

In response to the above-referenced technical inadequacies, the present disclosure provides a stereoscopic image display apparatus that does not require any lens array component to be disposed thereon, thereby reducing cost and processing difficulty, and improving image quality.

In one aspect, the present disclosure provides a stereoscopic image display apparatus. The stereoscopic image display apparatus includes a display module, a backlight module, and an image algorithm unit. The display module has a display surface. The display module is configured to turn on a plurality of pixels that are required to be used and is configured to turn off a plurality of pixels that are not required to be used. The pixels that are required to be used are spaced apart from each other. The backlight module is disposed at one side of the display module away from the display surface. The backlight module includes a plurality of light sources that are spaced apart from each other. The image algorithm unit is electrically connected to the display module and the backlight module. A plurality of un-reconstructed images displayed by the display surface are configured to be reassembled into a plurality of integrated images to form a plurality of stereoscopic images through the light sources and the pixels that are required to be used.

Therefore, the stereoscopic image display apparatus of the present disclosure includes the effects as follows. The stereoscopic image display apparatus of the present disclosure includes the display module, the backlight module, and the image algorithm unit. The display module is configured to turn on the pixels that are required to be used and is configured to turn off the pixels that are not required to be used, the backlight module includes a plurality of light sources, and the un-reconstructed images displayed by the display surface are configured to be reassembled into the integrated images to form the stereoscopic images through the light sources and the pixels that are required to be used. The stereoscopic image display apparatus of the present disclosure does not require any lens array component to be disposed thereon, so that the manufacture cost and manufacture difficulty thereof are reduced, and the image quality is improved.

Since the stereoscopic image display apparatus of the present disclosure does not require any lens array component to be disposed thereon, it is suitable for a large size application. In addition, by the design of a light source angle at a bottom side of the stereoscopic image display apparatus, the occurrence of wrong images in other orders can be prevented or reduced, and the image quality is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
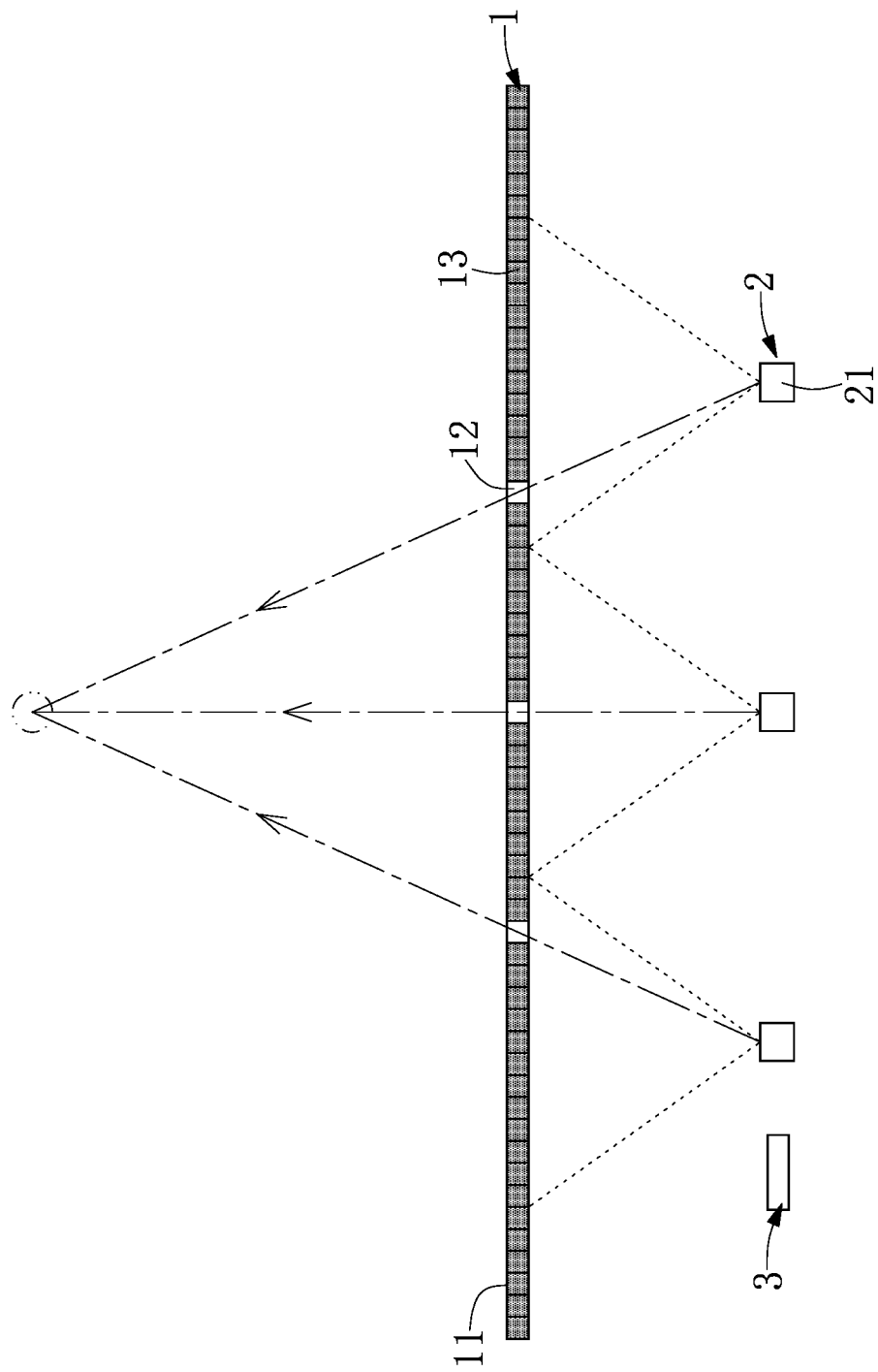
FIG. 1 is a planar schematic view of a stereoscopic image display apparatus according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

The present disclosure provides a stereoscopic image display apparatus that can be used in various industries such as optoelectronics, medical, military, exhibition, display device, education, entertainment, and consumer electronics. The stereoscopic image display apparatus can be used in an active image display device or a passive image display device, and the present disclosure is not limited thereto.

Referring to FIG. 1, the stereoscopic image display apparatus of the present disclosure includes a display module 1, a backlight module 2, and an image algorithm unit 3. The display module 1 has a display surface 11. In the present embodiment, the display module 1 is a liquid crystal display panel having a color filter, the display module 1 has a plurality of pixels, the display module 1 can turn on the pixels 12 that are required to be used and can turn off the pixels 13 that are not required to be used through software, and the pixels 12 that are required to be used are spaced apart from each other. The display module 1 has a light field adjusting function. The display module 1 can adjust a light angle of a stereoscopic object so that an un-reconstructed planar image is redistributed and assembled, such as to enable a user to view a 3D stereoscopic image. Moreover, diameters and heights of the pixels 12 that are required to be used and a distance between the pixels 12 that are required to be used and the backlight module 2 can be appropriately changed to determine a height, a viewing angle range and clarity of the 3D stereoscopic image. The pixels 12 that are required to be used are related to a display effect, and an arrangement of the pixels 12 that are required to be used can be a rectangular arrangement or a hexagonal arrangement. In other words, any two adjacent rows of the pixels 12 that are required to be used can be in a corresponding arrangement or a staggered arrangement, and are configured to display a 3D stereoscopic image data.

The backlight module 2 is disposed at one side of the display module 1. In the present disclosure, the backlight module 2 is spaced apart from the display module 1 and is disposed at one side of the display module 1 away from the display surface 11. The backlight module 2 is configured to emit a plurality of light beams. The light beams pass through the display module 1 so that information is transmitted to a user's eyes. The backlight module 2 includes a plurality of light sources 21, each of the light sources 21 can be a light-emitting diode (LED) light source or an organic light-emitting diode (OLED) light source, and each of the light sources 21 can be a point light source or a planar light source. In the present embodiment, each of the light sources 21 is a white-light light source, and the light sources 21 are spaced apart from each other. The light sources 21 can provide a function similar to that of a pinhole array layer, and the light sources 21 can respectively correspond to the pixels 12 that are required to be used. The image algorithm unit 3 is electrically connected to the display module 1 and the backlight module 2. A planar image can be reconstructed into a stereoscopic image through the light sources 21 and the display module 1 for display.

A conventional naked-eye 3D stereoscopic image display apparatus has a problem that a user cannot see the 3D stereoscopic image at an oblique viewing angle. More specifically, when the user is directly in front of the display module 1 (i.e., zero order viewing zone), the display module 1 provides a limited viewing angle zone for the user. Once the user's sight is directed away from the viewing angle zone, the user will not see the accurate stereoscopic image corresponding to the viewing angle of the user. On the contrary, the main feature of the present embodiment is that even when the user is not directly in front of the display module 1, the user can still see the accurate 3D stereoscopic image at an oblique viewing angle. In order to allow the user to see the accurate 3D stereoscopic image at the oblique viewing angle, the present embodiment employs an oblique angle image display method instead of a zero order (forward) image display method. That is, paths of light beams converge into an oblique direction so that the user can see the accurate stereoscopic image at the oblique viewing angle. It should be noted that the stereoscopic image display apparatus of the present embodiment also enables the user to see the accurate 3D stereoscopic image at a frontal viewing angle (directly in front of the display module).

The display module 1 of the present disclosure can be of any specification as long as it can be applied with an image algorithm. That is, the display module 1 is electrically connected to the image algorithm unit 3. The image used in the display module 1 is calculated by the image algorithm.

This calculation matches with the configuration of the backlight module 2, and predicts the various possible paths of the light beams, thereby enabling calculation of the relative position of the image. Since the image algorithm has been disclosed in the related art and is not the focus of the present disclosure, the details of the image algorithm will not be reiterated herein.

Accordingly, the present disclosure provides a stereoscopic image display apparatus which can be viewed in a frontal viewing angle and an oblique viewing angle. The stereoscopic image display apparatus, in conjunction with the hardware arrangement, can control the direction of the light beam emitted from each of the pixels in the display module 1. The hardware system of the present disclosure includes relatively simple optical elements, such as the display module 1, the backlight module 2, and the image algorithm unit 3, which can be packaged into a package. Also, the hardware system is configured to display a realistic stereoscopic image in mid-air by virtue of the design of the pixel size, the system gap, and the focal length, and by virtue of the integrated image principle in cooperation with the screen output signal calculated by the particular algorithm. In terms of the hardware, the stereoscopic image display apparatus of the present disclosure is only required to include the display module 1, the backlight module 2, and the image algorithm unit 3 to enable production of the stereoscopic image floating in mid-air without using other optical films, thereby providing a relatively simple structure.

Second Embodiment

Figure 2:
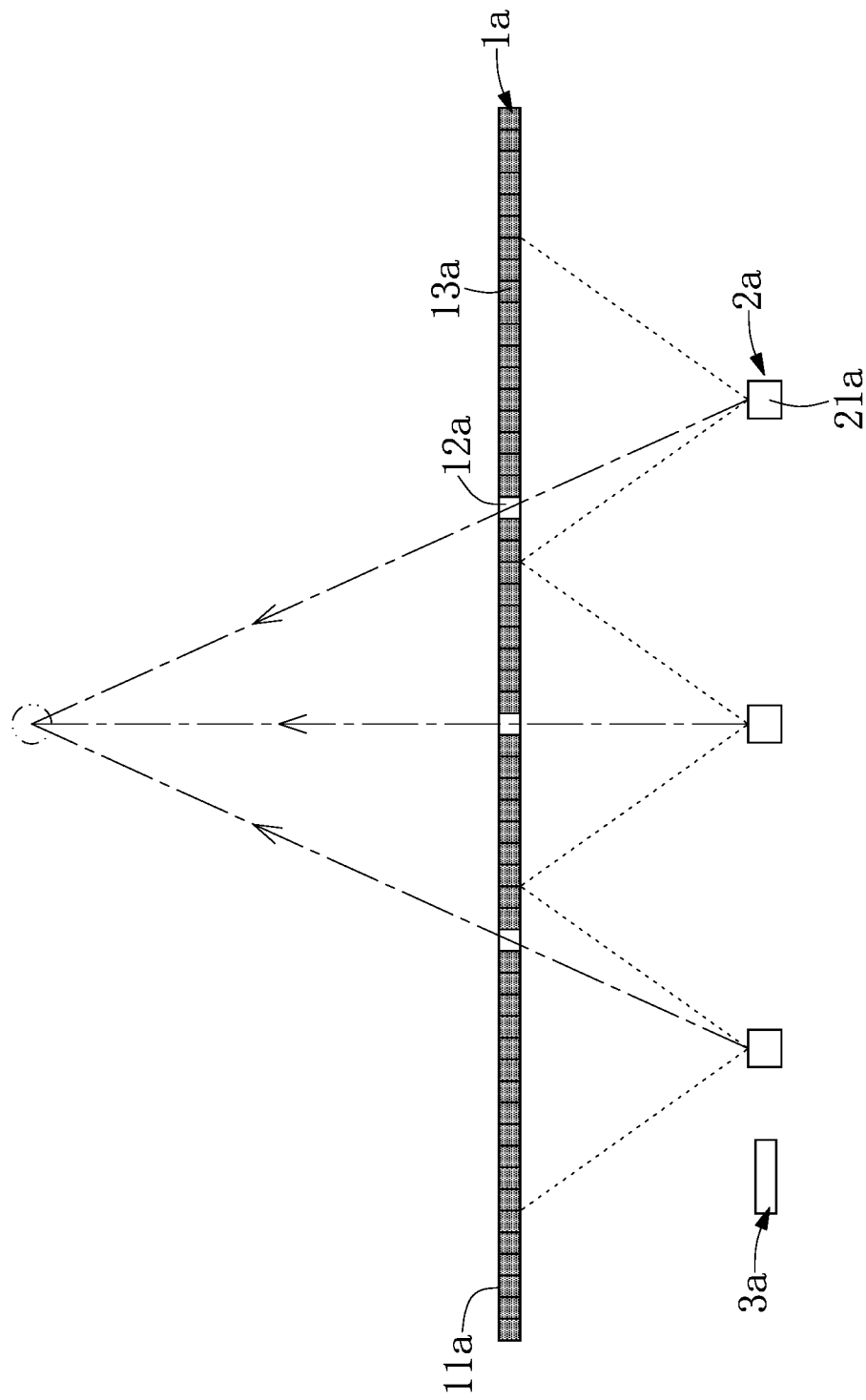
FIG. 2 is a planar schematic view of the stereoscopic image display apparatus according to a second embodiment of the present disclosure.

Referring to FIG. 2, the stereoscopic image display apparatus of the present embodiment includes a display module 1*a*, a backlight module 2*a*, and an image algorithm unit 3*a*. A structure of the stereoscopic image display apparatus of the present embodiment is similar to that of the stereoscopic image display apparatus in the first embodiment. The display module 1*a* includes a display surface 11*a*, and the display module 1*a* is configured to turn on the pixels 12*a* that are required to be used and turn off the pixels 13*a* that are not required to be used. The backlight module 2*a* includes a plurality of light sources 21*a*. The difference between the present embodiment and the first embodiment is that the light sources 21*a* include a red-light light source, a green-light light source, and a blue-light light source, and the red-light light source, the green-light light source, and the blue-light light source are configured to be displayed at the same time to increase a color gamut. The backlight module 2*a* is configured to emit a plurality of light beams. The light beams pass through the display module 1*a* so that information is transmitted to a user's eyes. A planar image can be reconstructed into a stereoscopic image through the light sources 21*a* and the display module 1*a* for display.

Third Embodiment

Figure 3:
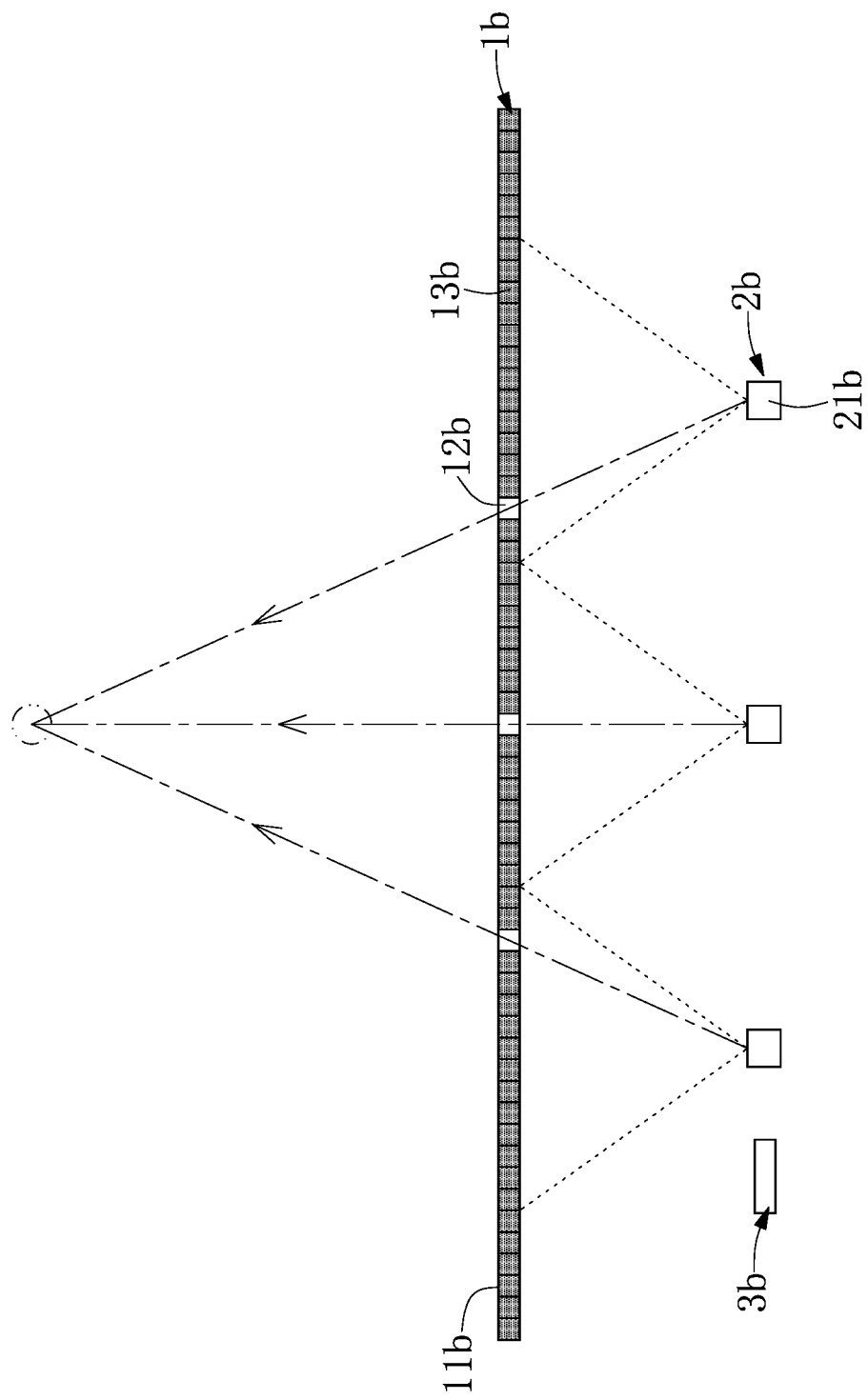
FIG. 3 is a planar schematic view of the stereoscopic image display apparatus according to a third embodiment of the present disclosure.

Referring to FIG. 3, the stereoscopic image display apparatus of the present embodiment includes a display module 1*b*, a backlight module 2*b*, and an image algorithm unit 3*b*. A structure of the stereoscopic image display apparatus of the present embodiment is similar to that of the stereoscopic image display apparatus in the first embodiment. The display module 1*b* includes a display surface 11*b*. The difference between the present embodiment and the first embodiment is as below. In the present embodiment, the display module 1*b* is configured to control a plurality of penetration rates of different pixels. For example, the display module 1*b* can be an electro-wetting (EW) device, a liquid crystal display device, or other technologies with field sequential (FS) technology. The display module 1*b* is configured to turn on the pixels 12*b* that are required to be used and turn off the pixels 13*b* that are not required to be used, and the pixels 12*b* that are required to be used are configured to control different penetration rates. The backlight module 2*b* includes a plurality of light sources 21*b*, the light sources 21*b* at least include a red-light light source, a green-light light source, and a blue-light light source, and the red-light light source, the green-light light source, and the blue-light light source are configured to be displayed in time-sequential order. The light sources 21*b* are configured to emit a plurality of light beams. The light beams pass through the display module 1*b* so that information is transmitted to a user's eyes. The display surface 11*b* can show at least three primary colors of red, green, and blue in time-sequential order, and the at least three primary colors are overlapped to form a full color image. The display module 1*b* capable of controlling the penetration rates of different pixels is configured to reassemble the un-reconstructed image having the at least three primary colors displayed by the display surface 11*b* into an integrated image.

Fourth Embodiment

Figure 4:
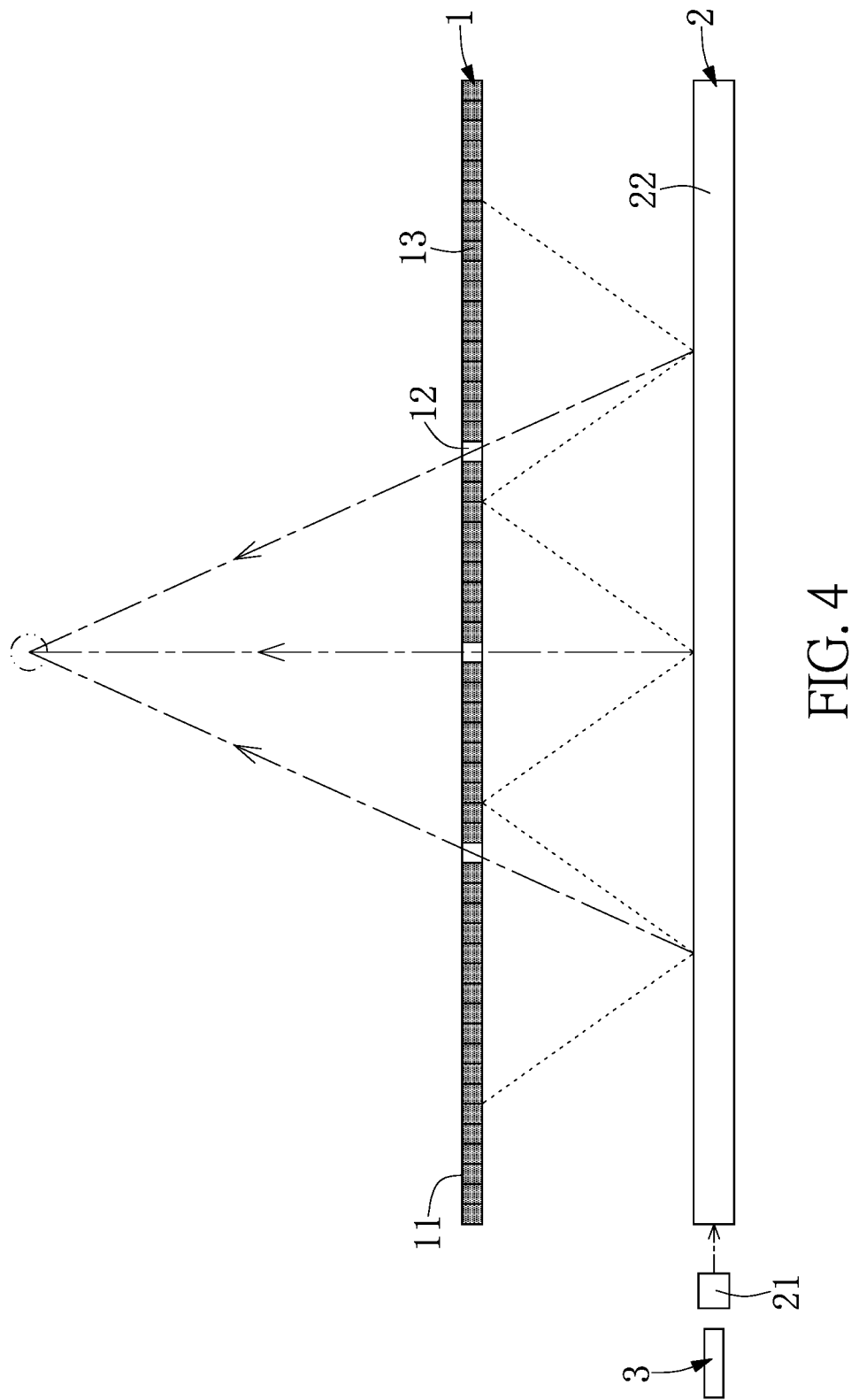
FIG. 4 is a planar schematic view of the stereoscopic image display apparatus according to a fourth embodiment of the present disclosure.

Referring to FIG. 4, a structure of the stereoscopic image display apparatus of the present embodiment is similar to that of the stereoscopic image display apparatus in the first embodiment. In the present embodiment, the light source 21 is a white-light light source. The difference between the present embodiment and the first embodiment is that a light guiding device 22 is disposed at one side of the light source 21 to provide the light source 21 with a light guiding effect. Therefore, the light beam emitted by the light source 21 can be more accurately guided to the display module 1. More specifically, the light beam in the present embodiment is emitted by the light source 21 disposed between the image algorithm unit 3 and the light guiding device 22, but the quantity and the disposed position of the light source 21 can be changed according to practical requirements, and the present disclosure is not limited thereto. The light beam passes through the display module 1 so that information is transmitted to a user's eyes. A planar image can be reconstructed into a stereoscopic image through the light source 21 and the display module 1 for display.

Fifth Embodiment

Figure 5:
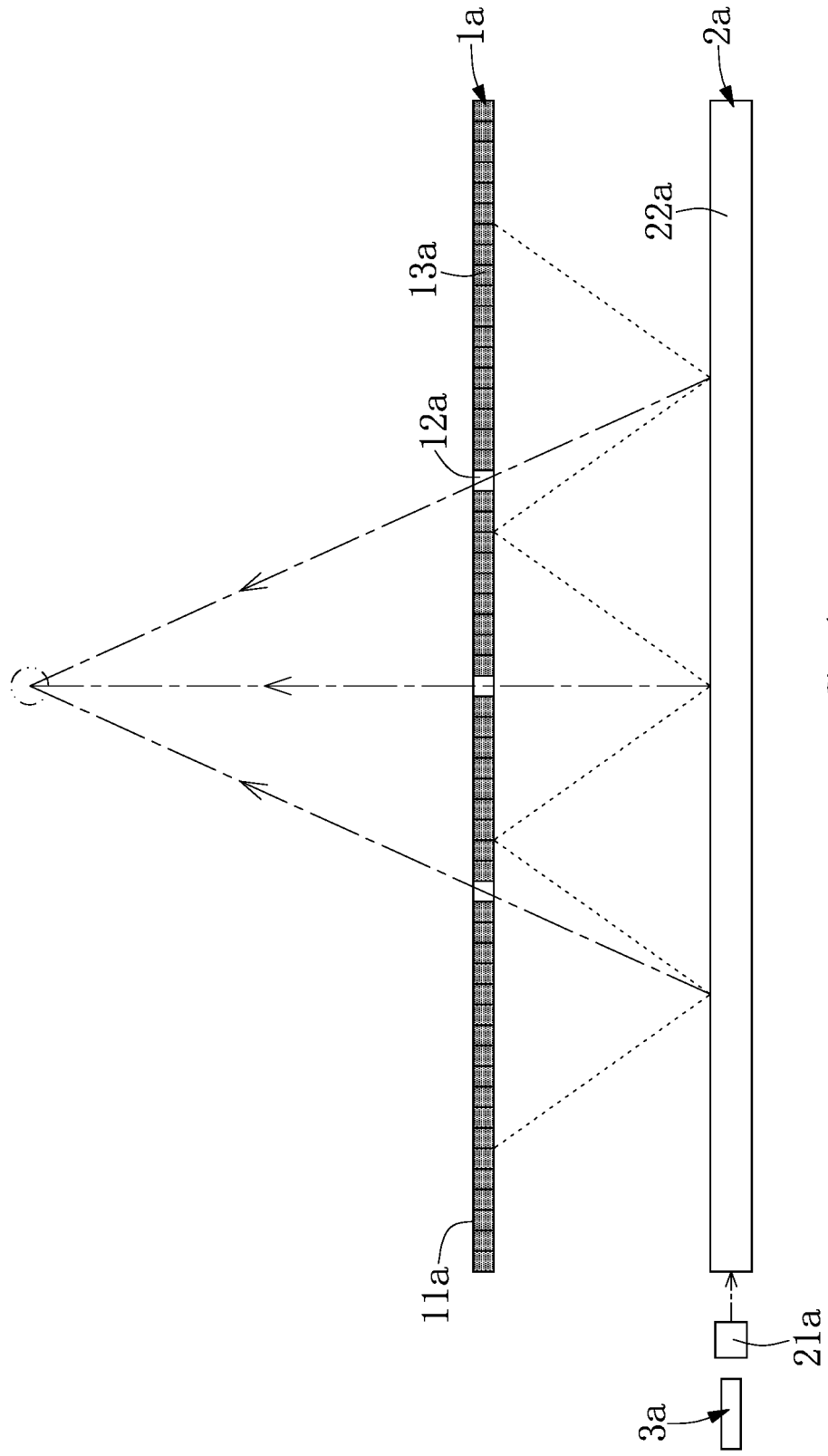
FIG. 5 is a planar schematic view of the stereoscopic image display apparatus according to a fifth embodiment of the present disclosure.

Referring to FIG. 5, a structure of the stereoscopic image display apparatus of the present embodiment is similar to that of the stereoscopic image display apparatus in the second embodiment. In the present embodiment, the light source 21*a* at least includes a red-light light source, a green-light light source, and a blue-light light source, and the red-light light source, the green-light light source, and the blue-light light source are configured to be displayed at the same time. The difference between the present embodiment and the second embodiment is that a light guiding device 22*a* is disposed at one side of the light source 21*a* to provide the light source 21*a* with a light guiding effect. Therefore, the light beam emitted by the light source 21*a* can be more accurately guided to the display module 1*a*. More specifically, the light beam in the present embodiment is emitted by the light source 21*a* disposed between the image algorithm unit 3*a* and the light guiding device 22*a*, but the quantity and the disposed position of the light source 21*a* can be changed according to practical requirements, and the present disclosure is not limited thereto. The light beam passes through the display module 1*a* so that information is transmitted to a user's eyes. A planar image can be reconstructed into a stereoscopic image through the light source 21*a* and the display module 1*a* for display.

Sixth Embodiment

Figure 6:
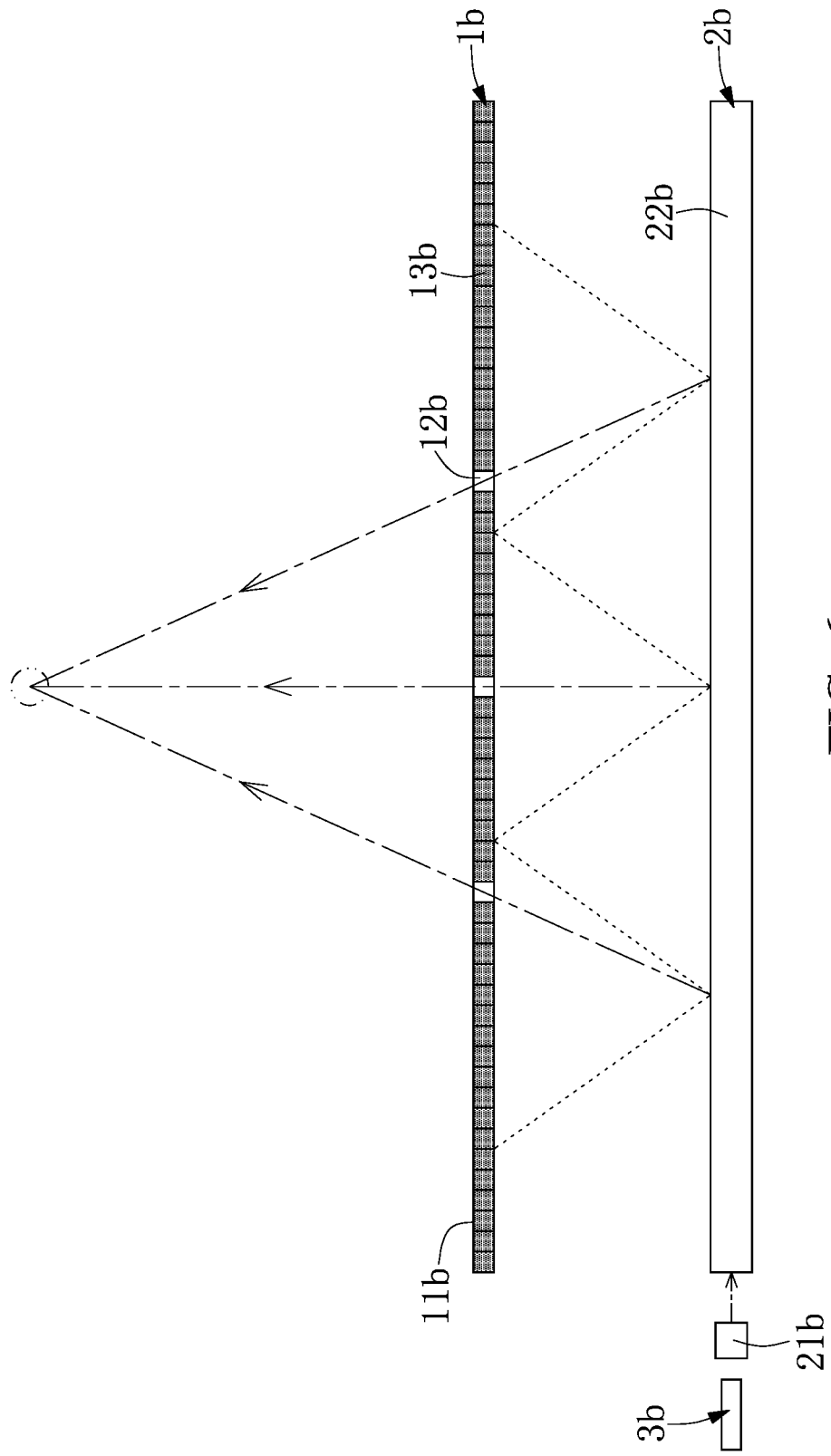
FIG. 6 is a planar schematic view of the stereoscopic image display apparatus according to a sixth embodiment of the present disclosure.

Referring to FIG. 6, a structure of the stereoscopic image display apparatus of the present embodiment is similar to that of the stereoscopic image display apparatus in the third embodiment. In the present embodiment, the display module 1*b* is configured to control a plurality of penetration rates of different pixels. For example, the display module 1*b* can be an electro-wetting (EW) device, a liquid crystal display device, or other technologies with field sequential (FS) technology. The display module 1*b* is configured to turn on the pixels 12*b* that are required to be used and turn off the pixels 13*b* that are not required to be used, and the pixels 12*b* that are required to be used are configured to control different penetration rates. The backlight module 2*b* includes a light source 21*b*, the light source 21*b* at least includes a red-light light source, a green-light light source, and a blue-light light source, and the red-light light source, the green-light light source, and the blue-light light source are configured to be displayed in time-sequential order. The difference between the present embodiment and the third embodiment is that a light guiding device 22*b* is disposed at one side of the light source 21*b* to provide the light source 21*b* with a light guiding effect. Therefore, the light beam emitted by the light source 21*b* can be more accurately guided to the display module 1*b*. More specifically, the light beam in the present embodiment is emitted by the light source 21*b* disposed between the image algorithm unit 3*b* and the light guiding device 22*b*, but the quantity and the disposed position of the light source 21*b* can be changed according to practical requirements, and the present disclosure is not limited thereto. The light beam passes through the display module 1*b* so that information is transmitted to a user's eyes. A planar image can be reconstructed into a stereoscopic image through the light source 21*b* and the display module 1*b* for display.

Seventh Embodiment

Figure 7:
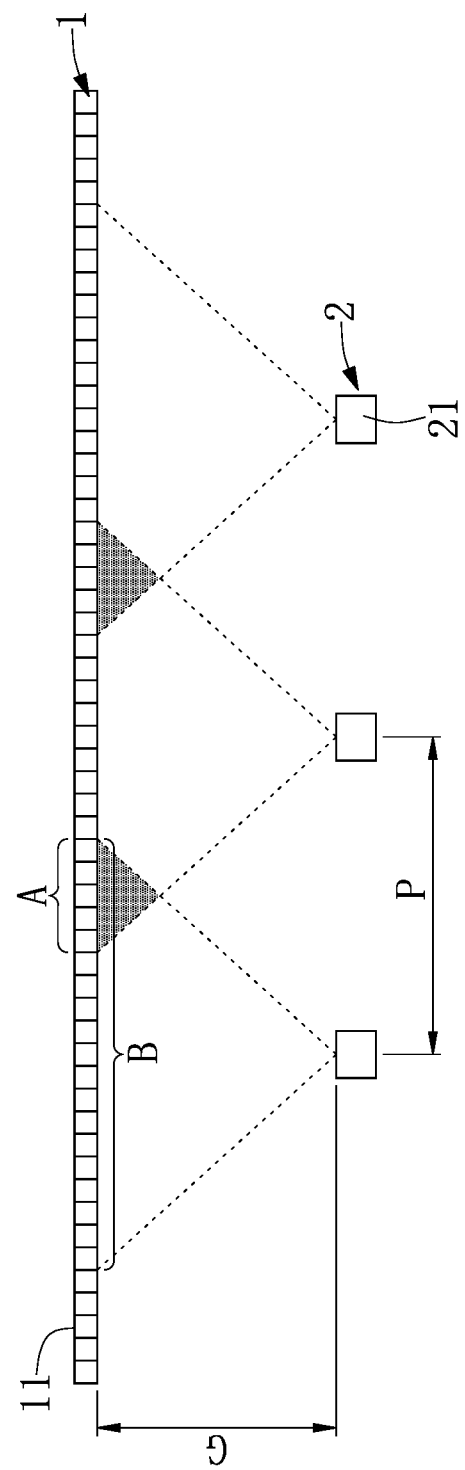
FIG. 7 is a planar schematic view of the stereoscopic image display apparatus according to a seventh embodiment of the present disclosure.

Referring to FIG. 7, the present embodiment further discloses that a center-to-center pitch P between any two of the adjacent light sources 21 is less than 15 mm, and a gap G between the light sources 21 and the display module 1 is less than 45 mm. Preferably, an area of an overlapping portion of the light beams of any two of the adjacent light sources 21 projected onto the display module 1 is defined as a first area A, an area of a portion of the light beam of one of the light sources 21 projected onto the display module 1 is defined as a second area B, and the first area A is less than 50% of the second area B. Accordingly, a better stereoscopic image display effect can be achieved. In other embodiments, a center-to-center pitch P between any two of the adjacent light sources 21 is less than 10 mm, and a gap G between the light sources 21 and the display module 1 is less than 30 mm. In other embodiments, a center-to-center pitch P between any two of the adjacent light sources 21 is less than 5 mm, and a gap G between the light sources 21 and the display module 1 is less than 15 mm.

In other embodiments, a center-to-center pitch P between any two of the adjacent light sources 21 is less than 15 mm, and a gap G between the light sources 21 and the display module 1 is less than 45 mm. In other embodiments, a center-to-center pitch P between any two of the adjacent light sources 21 is less than 10 mm, and a gap G between the light sources 21 and the display module 1 is less than 30 mm. In other embodiments, a center-to-center pitch P between any two of the adjacent light sources 21 is less than 5 mm, a gap G between the light sources 21 and the display module 1 is less than 15 mm, and the first area A is less than 50% of the second area B.

In conclusion, the stereoscopic image display apparatus of the present disclosure includes the effects as follows. The stereoscopic image display apparatus of the present disclosure includes the display module, the backlight module, and the image algorithm unit. The display module is configured to turn on the pixels that are required to be used and is configured to turn off the pixels that are not required to be used. The un-reconstructed images displayed by the display surface are configured to be reassembled into the integrated images to form the stereoscopic images through the light sources and the pixels that are required to be used. The stereoscopic image display apparatus of the present disclosure does not require any lens array component to be disposed thereon, so that the manufacture cost and manufacture difficulty thereof are reduced, and the image quality is improved.

Since the stereoscopic image display apparatus of the present disclosure does not require any lens array component to be disposed thereon, it is suitable for a large size application. In addition, by the design of a light source angle at a bottom side of the stereoscopic image display apparatus, wrong images in other orders can be prevented or reduced, and the image quality is improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A stereoscopic image display apparatus, comprising
a display module having a display surface, wherein the display module is configured to turn on a plurality of pixels that are required to be used and is configured to turn off a plurality of pixels that are not required to be used, and wherein the pixels that are required to be used are spaced apart from each other;
a backlight module disposed at one side of the display module away from the display surface, wherein the backlight module includes a plurality of light sources that are spaced apart from each other; and
an image algorithm unit electrically connected to the display module and the backlight module,
wherein a plurality of un-reconstructed images displayed by the display surface are configured to be reassembled into a plurality of integrated images to form a plurality of stereoscopic images through the light sources and the pixels that are required to be used, wherein an area of an overlapping portion of light beams of any two adjacent ones of the light sources projected onto the display module is defined as a first area, an area of a portion of the light beam of any one of the light sources projected onto the display module is defined as a second area, and the first area is less than 50% of the second area, and wherein no lens array component is disposed on the stereoscopic image display apparatus.

2. The stereoscopic image display apparatus according to claim 1, wherein the display module is a liquid crystal display panel having a color filter.

3. The stereoscopic image display apparatus according to claim 1, wherein the backlight module is spaced apart from the display module and is disposed at the one side of the display module away from the display surface.

4. The stereoscopic image display apparatus according to claim 1, wherein each of the light sources is a white-light light source.

5. The stereoscopic image display apparatus according to claim 1, wherein the light sources at least include a red-light light source, a green-light light source, and a blue-light light source, and the red-light light source, the green-light light source, and the blue-light light source are configured to be displayed at the same time.

6. The stereoscopic image display apparatus according to claim 1, wherein the light sources at least include a red-light light source, a green-light light source, and a blue-light light source, and the red-light light source, the green-light light source, and the blue-light light source are configured to be displayed in time-sequential order.

7. The stereoscopic image display apparatus according to claim 6, wherein the pixels that are required to be used are configured to control a plurality of different penetration rates.

8. The stereoscopic image display apparatus according to claim 1, wherein a light guiding device is disposed at one side of the light sources, and the light guiding device is configured to provide the light sources with a light guiding effect.

9. The stereoscopic image display apparatus according to claim 1, wherein a center-to-center pitch between any two of the adjacent light sources is less than 15 mm, and a gap between each of the light sources and the display module is less than 45 mm.

* * * * *